US006751825B2

(12) United States Patent
Zuccaro et al.

(10) Patent No.: US 6,751,825 B2
(45) Date of Patent: Jun. 22, 2004

(54) WIPER FOR MULTIPLE AND INDEPENDENT SURFACES

(75) Inventors: Dante Cataldo Zuccaro, Oxford, MI (US); Mark Steven Babcock, Harrison Township, MI (US)

(73) Assignee: General Motors Corporation, Detroit, MI (US)

( * ) Notice: Subject to any disclaimer, the term of this patent is extended or adjusted under 35 U.S.C. 154(b) by 104 days.

(21) Appl. No.: 10/066,845

(22) Filed: Feb. 4, 2002

(65) Prior Publication Data

US 2003/0145411 A1 Aug. 7, 2003

(51) Int. Cl.[7] .............................. B60S 1/58; B60S 1/04
(52) U.S. Cl. ................. 15/250.19; 15/250.001
(58) Field of Search ....................... 15/250.19, 250.001, 15/250.351, 250.16, 250.21, 250.002

(56) References Cited

U.S. PATENT DOCUMENTS

| 1,274,983 | A | | 8/1918 | Bridgwood | 15/250.19 |
|---|---|---|---|---|---|
| 3,019,468 | A | * | 2/1962 | Hatch | 15/250.19 |
| 3,110,920 | A | | 11/1963 | Dangler | 15/250.19 |
| 4,310,943 | A | | 1/1982 | Palma | 15/250.19 |
| 5,101,531 | A | | 4/1992 | Edwards et al. | 15/250.19 |
| 5,274,875 | A | | 1/1994 | Chou | 15/250.19 |
| 5,469,595 | A | | 11/1995 | Dara | 15/250.19 |
| 5,551,116 | A | | 9/1996 | DeKelaita | 15/250.19 |
| 5,720,072 | A | | 2/1998 | Boissac | 15/250.19 |
| 5,867,858 | A | | 2/1999 | Kelly | 15/250.19 |

FOREIGN PATENT DOCUMENTS

| JP | 60-215453 | * | 10/1985 | | 15/250.19 |
|---|---|---|---|---|---|
| JP | 2-164651 | * | 6/1990 | | 15/250.19 |

OTHER PUBLICATIONS

Photographs of wiper parking cam of 2002 Chevrolet Trail Blazer, General Motors Corp, Detroit, MI. Similar wiper parking systems on the market since at least Oct. 31, 2000.

* cited by examiner

Primary Examiner—Gary K. Graham
(74) Attorney, Agent, or Firm—Laura C. Hargitt

(57) ABSTRACT

A singular wiper for wiping multiple and independent surfaces which obviates the conventional need for a wiper respectively for each of the surfaces. The wiper includes a wiper motor assembly, a wiper arm connected to the wiper motor assembly, a blade assembly connected to the wiper arm, and a cam having a cam profile. The wiper motor assembly reciprocates the wiper arm and thereby reciprocates the blade assembly over a predetermined range of reciprocation. The cam profile interacts with the wiper arm in a normal direction that is perpendicular to the plane of reciprocation of the wiper assembly so as to selectively regulate contact of the blade assembly with various surfaces disposed in the range of reciprocation of the blade assembly.

4 Claims, 5 Drawing Sheets

US 6,751,825 B2

WIPER FOR MULTIPLE AND INDEPENDENT SURFACES

TECHNICAL FIELD

The present invention relates to wipers used in automotive applications for wiping glass surfaces, and more particularly to a singular wiper which is capable of wiping multiple and independent glass surfaces.

BACKGROUND OF THE INVENTION

Motor vehicles having rear gate/door glass are frequently equipped with one or more wipers, a wiper being needed for each independent glass surface. As shown at FIG. 1, motor vehicles 10 having two side-hinged doors 12L, 12R also have two independent rear glasses 14L, 14R. Conventionally, for each rear glass 14L, 14R a separate wiper 16L, 16R must be respectively provided. The reason for this is the multiplicity and independence of the rear glasses 14L, 14R. A wiper 16L which wipes the glass surface 18L of one rear glass 14L cannot wipe the glass surface 18R of the other rear glass 14R because they are separated by a discontinuity 20 in the form of elevated door skins 22L, 22R and the gap 24 between the doors.

A separate wiper for each multiple and independent glass surface requires a multiplicity of wipers, as well as the assembly costs for the necessary multiple installations on a single vehicle. Additionally each of the multiple installations involve added weight, wiring and servicing.

Accordingly, if a single wiper could somehow wipe multiple and independent surfaces, then a number of advantages would be realized as compared to the conventional practice of providing at least one wiper per glass surface, including: improvement of visibility, increased driver satisfaction, reduction of cost and weight, and better durability and dependability inherently emanating from a single wiper servicing multiple and independent surfaces.

SUMMARY OF THE INVENTION

The present invention is a singular wiper for wiping multiple and independent surfaces which obviates the conventional need for a wiper respectively for each of the surfaces.

The wiper for multiple and independent surfaces includes a wiper motor assembly, a wiper arm connected to the wiper motor assembly, a blade assembly connected to the wiper arm, and a cam having a cam profile. The wiper motor assembly reciprocates the wiper arm and thereby reciprocates the blade assembly over a predetermined range of reciprocation. The cam profile interacts with the wiper arm in a normal direction that is generally perpendicular to the plane of reciprocation of the wiper assembly so as to selectively regulate contact of the blade assembly with various surfaces disposed in the range of reciprocation of the blade assembly.

In an example of operation, a motor vehicle has left and right rear doors, each being provided with a rear glass that is independent of the other. The wiper motor assembly is mounted upon either the left or the right rear door, and the cam is also mounted thereto. The blade assembly reciprocates over a range of reciprocation which includes both rear glasses. In operation, during reciprocation of the wiper arm, the blade assembly wipes the surfaces of both of the rear glasses. The wiper arm is guidably moved in a normal direction by the cam profile, wherein the blade assembly translates away at portions of the drop glasses adjacent the discontinuity between the rear glasses so as to non-contactingly traverse the discontinuity. By way of example, the discontinuity may include rear door skin that is elevated in relation to the rear glass surfaces, which skin is non-contactingly traversed during reciprocation.

Accordingly, it is an object of the present invention to provide a singular wiper apparatus which is capable of wiping multiple and independent surfaces.

This and additional objects, features and advantages of the present invention will become clearer from the following specification of a preferred embodiment.

DESCRIPTION OF THE PREFERRED EMBODIMENT

Figure 1:
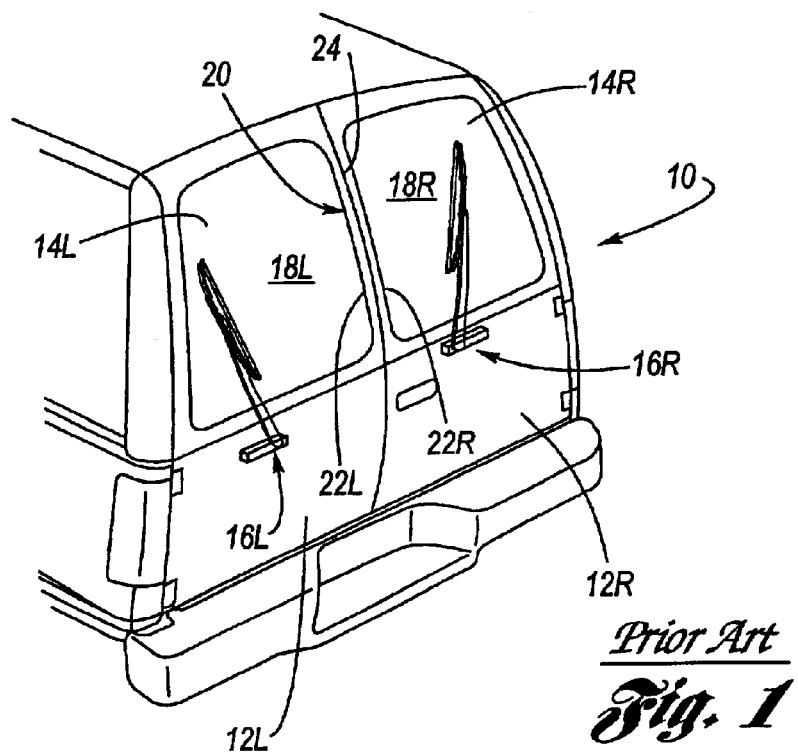
FIG. 1 is a perspective, broken-away, rear view of a motor vehicle equipped with a pair of prior art wipers, one wiper respectively for wiping each of its two independent rear glass surfaces.

Referring now to the Drawings, FIGS. 2 through 7 depict an example of a wiper for multiple and independent surfaces 100 (hereinafter referred to simply as a "MIS wiper"). As shown schematically at FIG. 2, the MIS wiper 100 includes a wipe motor assembly 102, a wiper arm 104 which is connected to the wiper motor assembly so as to be reciprocated thereby, a blade assembly 106 carried by the wiper arm at a distal end thereof, and a cam 108 for regulating normal movement (that is, perpendicular movement to the plane of reciprocation) of the blade assembly. The wiper motor assembly 102 causes the wiper arm 104 to reciprocate such that the blade assembly reciprocates over a range of reciprocation. The cam 108 has a cam profile 110 which the wiper arm 104 follows during one or more selected portions of the reciprocation, wherein the normal movement regulated thereby is perpendicular to the plane of reciprocation of the wiper blade assembly and away from the one or more surfaces being wiped by the blade assembly during reciprocation.

Figure 2:
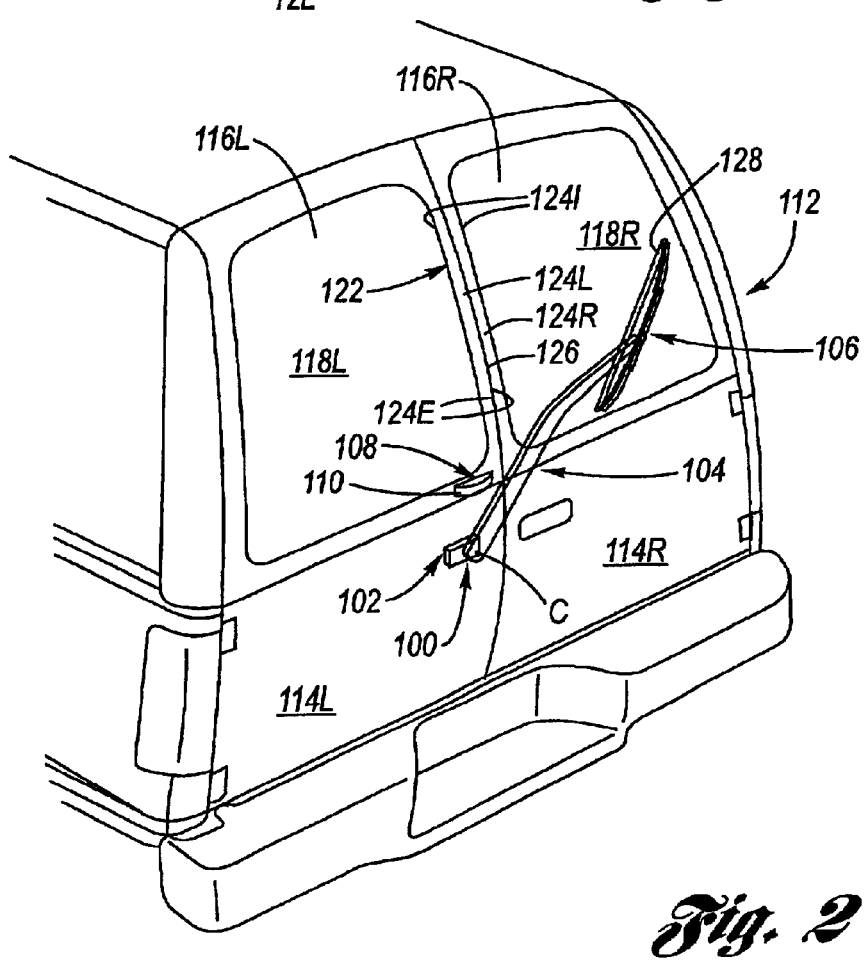
FIG. 2 is a perspective, broken-away, rear view of a motor vehicle equipped with a wiper for multiple and independent surfaces according to the present invention for wiping both of its two independent rear glass surfaces.

It will be noted from FIG. 2, which is an exemplification of an environment of operation of the MIS wiper 100 according to the present invention, a motor vehicle 112 has a pair of side-hinged doors 114L, 114R. Each door 114L, 114R has a respective rear glass 116L, 116R. The respective surface 118L, 118R of each of the rear glasses 116L, 116R is wiped by a single MIS wiper 100. By way of example, the wiper motor assembly 102 is mounted to the left door 114L, as is the cam 108. However, the wiper motor assembly 102 may be mounted to the right door, or otherwise (as for example on the roof); further the cam may be mounted otherwise, including straddling the doors or incorporation into existing components such as for example glass encapsulation, so long as it performs the cam following operation for the wiper arm 104 as described herein.

The range of reciprocation includes the two surfaces 118L, 118R, each being independent of the other by a surface discontinuity 122. The surface discontinuity 122 includes door skins 124L, 124R and the gap 126 therebetween. The wiper motor assembly 102 biases the wiper arm 104 toward the surfaces 118L, 118R so that as the blade assembly 106 reciprocates thereover, the wiper blade 128 thereof pressably wipes thereacross. The door skins 124L, 124R are elevated relative to the surfaces 118L, 118R with an abrupt interface 124I, and further have edges 124E at the gap 126. Accordingly, the wiper blade would be soon ruined if it were to wipe contactingly over the surface discontinuity 122.

The cam 108 is located so that the cam profile 110 thereof guides the wiper arm 104 so as to regulate the normal movement of the wiper assembly 106 such that the wiper blade makes no contact with any surfaces at the surface discontinuity 122. In a preferred form, the cam profile 110 has a generally convex shape which includes at either end up/down ramps 110', 110" for normally translating the wiper arm and keeping that translation at least sufficient for the wiper blade 128 to noncontactingly pass over all surfaces of the surface discontinuity 122.

Turning attention now to FIGS. 3 through 6 an example of operational movements of the MIS wiper 100 will be detailed, wherein the locations of the ramps 110', 110" (see FIG. 4A) of the cam profile 110, the location of the center of rotation C of the wiper arm 104, the shape and length of the wiper arm (as for example the acutely bent shape shown), the length of the wiper blade 128, and the range of reciprocation 120 are collectively predetermined so that the wiper blade provides a suitable area of wiping of the surfaces 118L, 118R.

Figure 3:
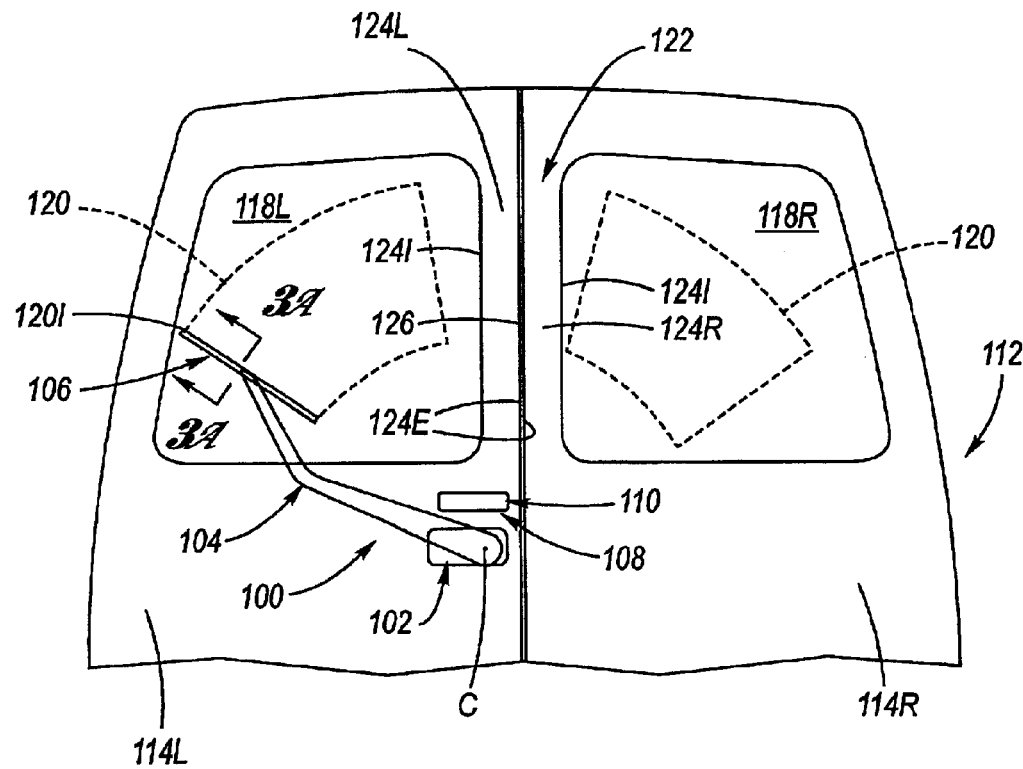
FIG. 3 is a rear view of a motor vehicle equipped with the wiper for multiple and independent surfaces according to the present invention, wherein the blade assembly is at a first position of its range of reciprocation.
Figure 3A:
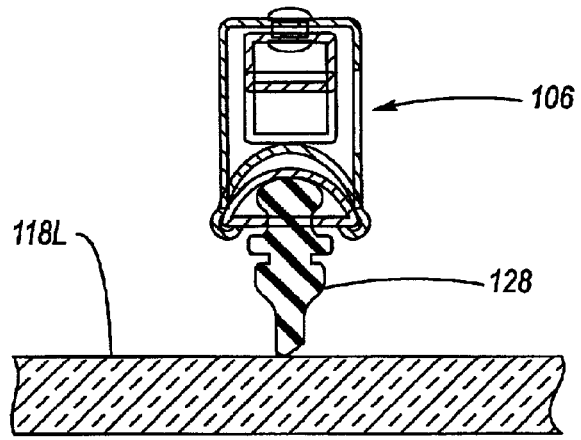
FIG. 3A is a sectional view seen along line 3A—3A.

FIG. 3 depicts the wiper assembly 106 at a first extreme position 1201 of the range of reciprocation 120. As shown at FIG. 3A, the wiper blade 128 is biased toward the surface 118L so that as the wiper assembly reciprocates, the surface is wiped by the blade.

Figure 4:
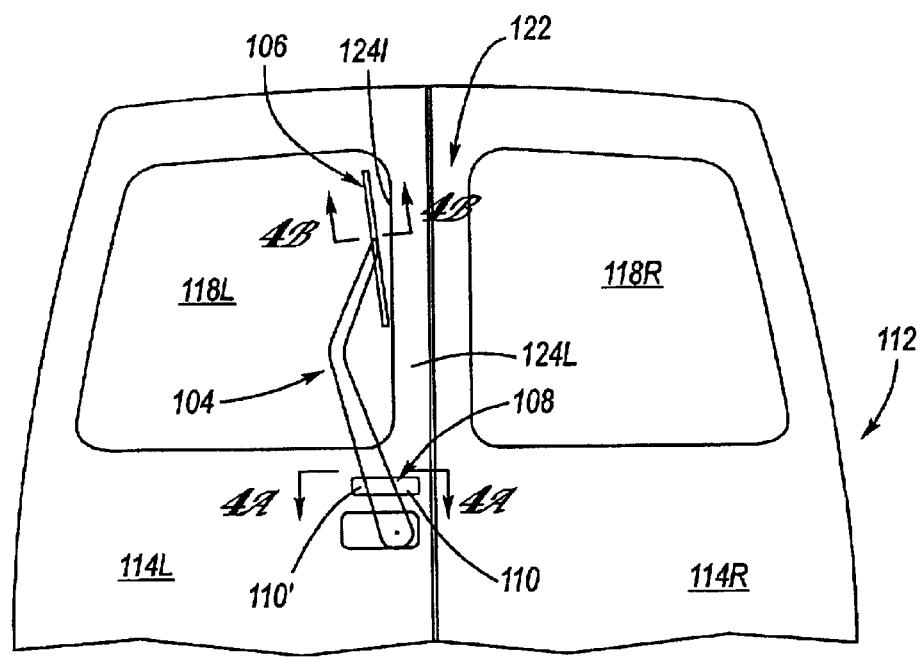
FIG. 4 is a rear view of a motor vehicle equipped with the wiper for multiple and independent surfaces according to the present invention, wherein the blade assembly is at a second position of its range of reciprocation.
Figure 4A:
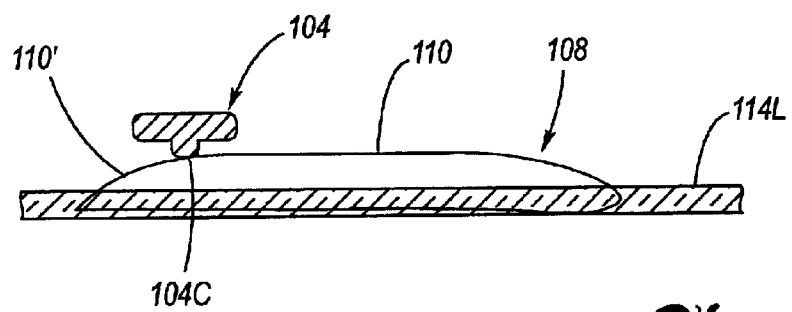
FIG. 4A is a partly perspective view seen along line 4A—4A in FIG. 4.
Figure 4B:
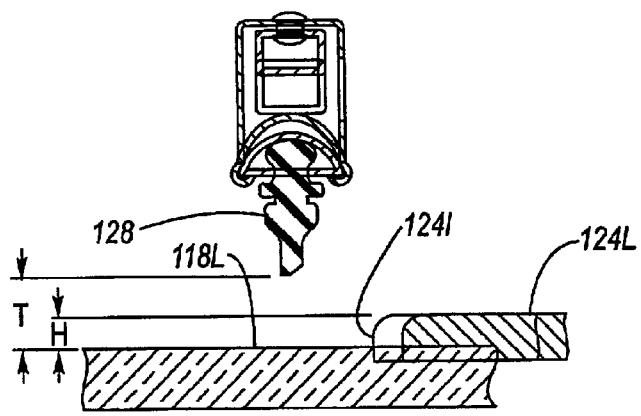
FIG. 4B is a partly sectional view seen along line 4B—4B in FIG. 4.

At FIG. 4, the wiper assembly 106 has reciprocated to adjacency with a first abrupt interface 124I of the surface discontinuity 122. Simultaneously, the wiper arm 104 has reciprocated into engagement with the cam 108. A cam follower 104C of the wiper arm 104 engages the cam profile 110 (see FIG. 4A). The cam follower 104C may be any suitably configured surface of the wiper arm for low friction, smooth sliding. Sliding friction is preferably minimized by choice of materials for the cam profile 110 and the cam follower 104C, so as to achieve excellent lubricity and wear resistance, as for example DELRIN®, generically known as acetel. Alternatively, the cam follower 104C may be a roller bearing. A first ramp 110' of the cam profile 110 provides a normal movement T in a direction perpendicular to the plane of reciprocation, at least as large as the height H of any surface of the surface discontinuity 122 relative to the wiping surfaces 118L, 118R (see FIG. 4B).

Figure 5:
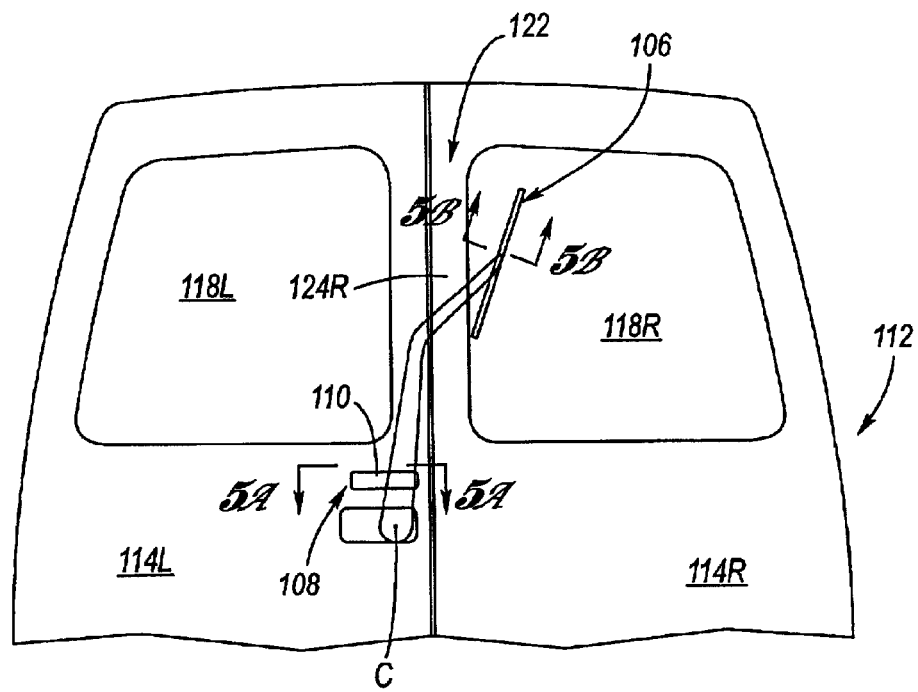
FIG. 5 is a rear view of a motor vehicle equipped with the wiper for multiple and independent surfaces according to the present invention, wherein the blade assembly is at a third position of its range of reciprocation.
Figure 5A:
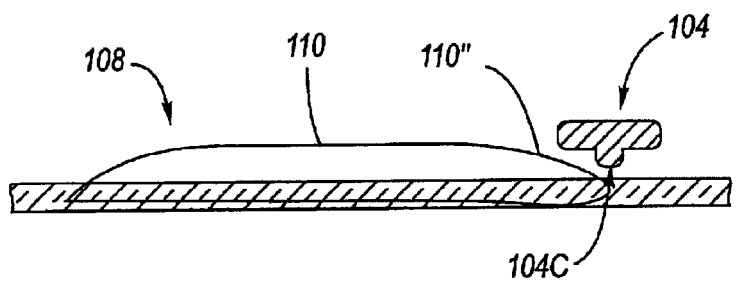
FIG. 5A is a partly perspective view seen along line 5A—5A in FIG. 5.
Figure 5B:
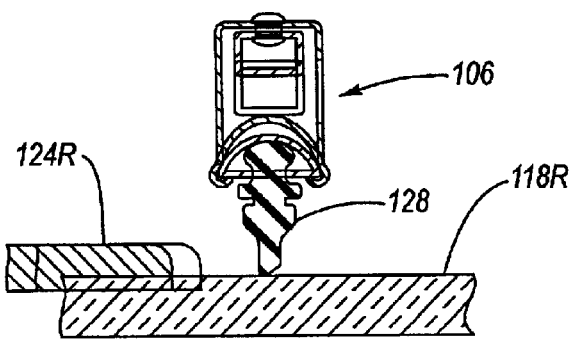
FIG. 5B is a partly sectional view seen along line 5B—5B in FIG. 5.

At FIG. 5, the wiper assembly 106 has passed noncontactingly over the surface discontinuity 122. The cam follower 104C has followed the second ramp 110" which results in the wiper blade 128 translating toward the surface 118R so that it is now contacting the surface 118R and biased thereagainst (see FIGS. 5A and 5B).

Figure 6:
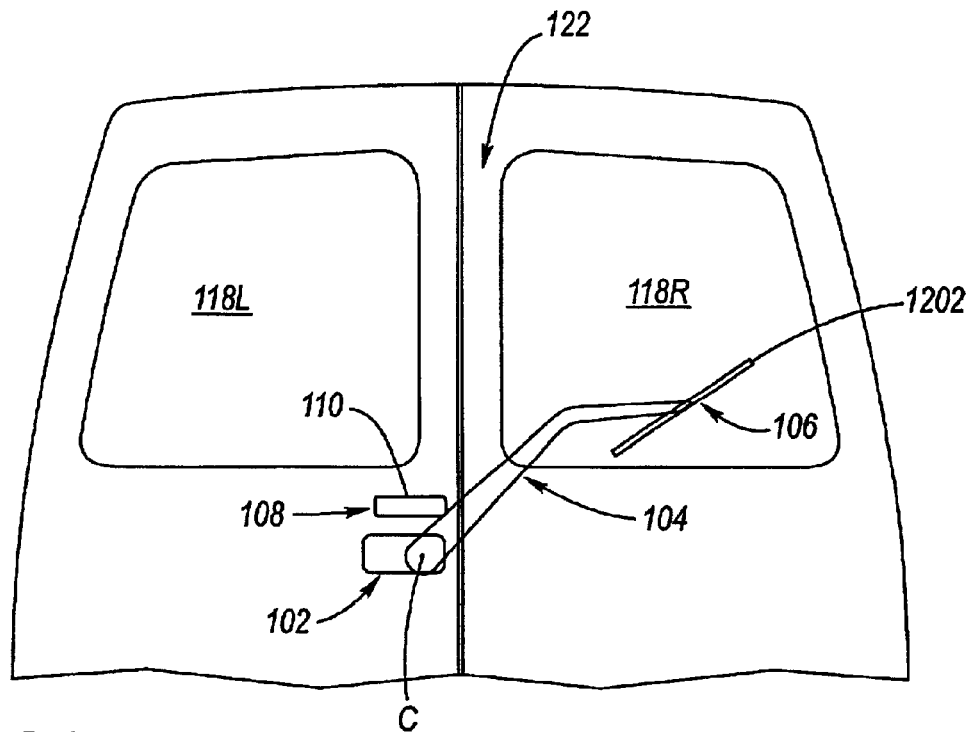
FIG. 6 is a rear view of a motor vehicle equipped with the wiper for multiple and independent surfaces according to the present invention, wherein the blade assembly is at a fourth position of its range of reciprocation.

At FIG. 6, the wiper assembly 106 has reached a second extreme position 1202 of the range of reciprocation 120 (see FIG. 3), wherein the wiper blade has wiped across the surface 118R.

The reciprocation direction is now reversed by the wiper motor assembly 102. During the reverse reciprocation, the cam follower 104C of the wiper arm 104 encounters the cam 108, wherein the first and second ramps 110', 110" of the cam profile 110 again provide normal translations of the wiper arm such that the surfaces 118L, 118R are wiped and the wiper blade 128 noncontactingly passes over the surface discontinuity 122.

A preferred park location of the wiper arm 104 is shown at FIG. 3. (Parking the wiper assembly straddling the surface discontinuity 122 is not viable since this would interfere with door operation and would nakedly expose the wiper assembly when the doors are opened). When the driver turns off the MIS wiper 100, known regulating electronics automatically parks the wiper arm at the FIG. 3 position.

Figure 7:
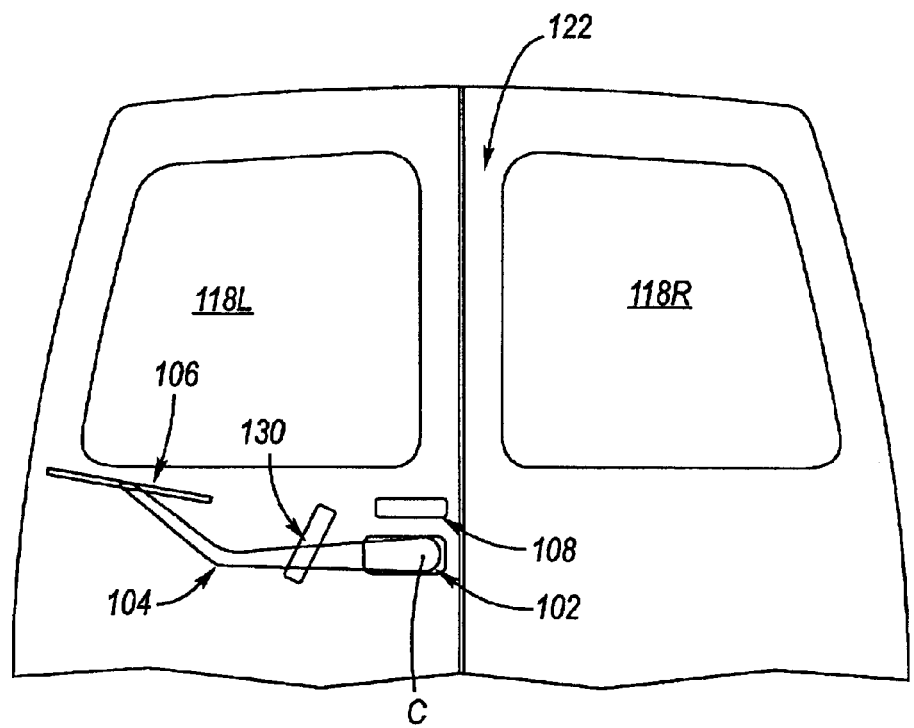
FIG. 7 is a rear view of a motor vehicle equipped with the wiper for multiple and independent surfaces according to the present invention, wherein the blade assembly is at an optional parked position beyond its range of reciprocation.

An alternative park position is depicted at FIG. 7. Now, the regulating electronics automatically parks the wiper arm 104 by an over-arc beyond the range of reciprocation 120 onto a parking cam 130. Parking cams for wipers are well known in the art. This parking alternative has the advantage that when parked, the wiper assembly does not block the rear glass, allowing for unfettered view therethrough, and/or reciprocation of the rear glass.

To those skilled in the art to which this invention appertains, the above described preferred embodiment may be subject to change or modification. For example, it is to be understood that while a single surface discontinuity between two adjacent wiping surfaces are shown and discussed herein, that any number of discontinuities and wiping surfaces may be accommodated by the MIS wiper according to the present invention. Further, while an arcing reciprocation is disclosed in detail herein, from such disclosure a person of ordinary skill is enabled to utilize the cam and wiper arm concept herein with respect to a lateral (a straight back and forth) reciprocation. Such change or modification can be carried out without departing from the scope of the invention, which is intended to be limited only by the scope of the appended claims.

What is claimed is:

1. A wiper and independent surfaces combination comprising:
   a first wipeable surface;
   a second wipeable surface separated from said first wipeable surface by a surface discontinuity;

a wiper comprising a blade assembly and a wiper motor assembly, wherein the wiper motor assembly reciprocates the blade assembly over a range of reciprocation which includes the first and second wipeable surfaces, wherein said blade assembly is biased in a first direction which is normal to the reciprocation and toward said first and second wipeable surfaces; and a cam for selectively interacting with said wiper at an intermediate location along the range of reciprocation so that said blade assembly is selectively moved in a second direction which is normal to the reciprocation and away from the first and second wipeable surfaces, wherein said blade assembly contactlessly passes over the surface discontinuity and wipingly contacts the first and second wipeable surfaces during the reciprocation; and wherein said first wipeable surface comprises a first rear glass of a first door of a motor vehicle; wherein said second wipeable surface comprises a second rear glass of a second door of the motor vehicle; and wherein said surface discontinuity comprises a portion of said first and second doors and a separation gap therebetween.

2. The combination of claim 1, wherein said wiper further comprises a wiper arm connected to each of said wiper motor assembly and said blade assembly; wherein the cam guidably interacts with said wiper arm to provide said selective movement in the second direction.

3. The combination of claim 2, wherein said wiper arm has a cam follower; wherein the cam has a cam profile; and wherein the guidable interaction is between the cam follower and the cam profile.

4. The combination of claim 3, wherein said wiper motor assembly and said cam are connected to a selected one of said first and second doors.

* * * * *